United States Patent
Bae

(10) Patent No.: US 9,966,998 B2
(45) Date of Patent: May 8, 2018

(54) WIRELESS POWER TRANSMITTER, WIRELESS POWER RECEIVER, AND POWER TRANSMISSION METHOD OF WIRELESS POWER TRANSMITTING SYSTEM

(71) Applicant: LG INNOTEK CO., LTD., Seoul (KR)

(72) Inventor: Su Ho Bae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 499 days.

(21) Appl. No.: 13/768,704

(22) Filed: Feb. 15, 2013

(65) Prior Publication Data

US 2013/0214612 A1   Aug. 22, 2013

(30) Foreign Application Priority Data

Feb. 17, 2012 (KR) .................. 10-2012-0016237
Mar. 7, 2012 (KR) .................. 10-2012-0023329

(51) Int. Cl.
*H02J 50/10* (2016.01)
*H02J 50/12* (2016.01)
(Continued)

(52) U.S. Cl.
CPC ............ *H04B 5/0037* (2013.01); *H02J 5/005* (2013.01); *H02J 7/025* (2013.01); *H02J 17/00* (2013.01);
(Continued)

(58) Field of Classification Search
CPC .... H04B 5/0037; H04B 5/0025–5/0093; H02J 5/005; H02J 7/025; H02J 17/00;
(Continued)

(56) References Cited

U.S. PATENT DOCUMENTS 8,111,041 B2   2/2012 Onishi et al.
2004/0100341 A1 *   5/2004 Luetzelschwab et al. ...... 333/32
(Continued)

FOREIGN PATENT DOCUMENTS

CN   101828339 A   9/2010
CN   10-2301564 A   12/2011
(Continued)

OTHER PUBLICATIONS

Office Action dated Sep. 30, 2014 in Chinese Application No. 201310052554.1.
(Continued)

*Primary Examiner* — Hal Kaplan
*Assistant Examiner* — Thai Tran
(74) *Attorney, Agent, or Firm* — Saliwanchik, Lloyd & Eisenschenk

(57) ABSTRACT

A wireless power transmitter for transmitting power to a wireless power receiver in a wireless scheme includes a transmitting coil configured to transmit power, which is supplied by a power source, to a receiving coil of the wireless power receiver using resonance; and a detecting unit configured to detect a coupling state between the transmitting coil and the receiving coil using an input impedance of the wireless power transmitter.

11 Claims, 12 Drawing Sheets

(51) Int. Cl.
    *H02J 50/80*     (2016.01)
    *H04B 5/00*     (2006.01)
    *H02J 7/02*     (2016.01)
    *H02J 5/00*     (2016.01)
    *H02J 17/00*     (2006.01)

(52) U.S. Cl.
    CPC ............ *H02J 50/12* (2016.02); *H02J 50/80* (2016.02); *H04B 5/0087* (2013.01)

(58) Field of Classification Search
    CPC . B60L 11/182; B60L 11/1829–11/1831; Y02T 90/122; H01F 38/14; H01F 2038/143–2038/146; A61B 1/00029; A61N 1/3787
    USPC .......................................... 307/104; 320/108
    See application file for complete search history.

(56) References Cited

U.S. PATENT DOCUMENTS

| | | | |
|---|---|---|---|
| 2009/0015075 A1 | 1/2009 | Cook et al. | |
| 2010/0007307 A1 | 1/2010 | Baarman et al. | |
| 2010/0164295 A1* | 7/2010 | Ichikawa et al. | 307/104 |
| 2010/0201204 A1 | 8/2010 | Sakoda et al. | |
| 2010/0201311 A1* | 8/2010 | Lyell Kirby et al. | 320/108 |
| 2010/0201316 A1 | 8/2010 | Takada et al. | |
| 2010/0277003 A1* | 11/2010 | Von Novak et al. | 307/104 |
| 2011/0049995 A1* | 3/2011 | Hashiguchi | H02J 5/005 307/104 |
| 2011/0053500 A1 | 3/2011 | Menegoli et al. | |
| 2011/0133569 A1 | 6/2011 | Cheon et al. | |
| 2011/0198938 A1 | 8/2011 | Park et al. | |
| 2011/0217926 A1* | 9/2011 | Low | H04B 5/0081 455/41.1 |
| 2011/0241440 A1 | 10/2011 | Sakoda et al. | |
| 2011/0248572 A1* | 10/2011 | Kozakai | H03F 1/565 307/104 |
| 2011/0266880 A1* | 11/2011 | Kim et al. | 307/104 |
| 2011/0266884 A1 | 11/2011 | Wako et al. | |
| 2011/0279079 A1* | 11/2011 | Do Valle | H02J 7/04 320/107 |
| 2011/0298294 A1 | 12/2011 | Takada et al. | |
| 2011/0316348 A1* | 12/2011 | Kai et al. | 307/104 |
| 2012/0025626 A1 | 2/2012 | Komiyama | |
| 2012/0038220 A1* | 2/2012 | Kim et al. | 307/104 |
| 2012/0038317 A1* | 2/2012 | Miyamoto | H02J 7/025 320/108 |
| 2012/0049861 A1* | 3/2012 | Kim et al. | 324/633 |
| 2012/0080957 A1* | 4/2012 | Cooper et al. | 307/104 |
| 2012/0098348 A1 | 4/2012 | Inoue et al. | |
| 2012/0104998 A1 | 5/2012 | Takada et al. | |
| 2012/0161538 A1* | 6/2012 | Kinoshita et al. | 307/104 |
| 2012/0175967 A1 | 7/2012 | Dibben et al. | |
| 2012/0286584 A1* | 11/2012 | Park et al. | 307/104 |
| 2012/0293006 A1* | 11/2012 | Kim et al. | 307/104 |
| 2013/0002034 A1 | 1/2013 | Onizuka et al. | |
| 2013/0057207 A1 | 3/2013 | Ichikawa et al. | |
| 2013/0119930 A1 | 5/2013 | Sakoda et al. | |
| 2013/0154386 A1 | 6/2013 | Bae | |

FOREIGN PATENT DOCUMENTS

| | | |
|---|---|---|
| EP | 2216878 A2 | 8/2010 |
| EP | 2348610 A1 | 7/2011 |
| EP | 2405556 A1 | 1/2012 |
| EP | 2608352 A1 | 6/2013 |
| JP | 2008-099352 A | 4/2008 |
| JP | 2008-206233 A | 9/2008 |
| JP | 2010-252446 A | 11/2010 |
| JP | 2011-050140 A | 3/2011 |
| JP | 2011045161 A | 3/2011 |
| JP | 2011-223739 A | 11/2011 |
| KR | 10-2006-0031526 A | 4/2006 |
| KR | 10-2010-0098715 A | 9/2010 |
| KR | 10-2011-0034664 | 4/2011 |
| KR | 10-2011-0062841 | 6/2011 |
| KR | 10-2011-0094739 | 8/2011 |
| KR | 10-2011-0103408 A | 9/2011 |
| KR | 10-2012-0015921 A | 2/2012 |
| TW | 2012-08243 A1 | 2/2012 |
| WO | WO-2011028956 A2 | 3/2011 |
| WO | WO-2011033660 A1 | 3/2011 |
| WO | WO-2011/148254 A2 | 12/2011 |
| WO | WO-2012/014482 A1 | 2/2012 |

OTHER PUBLICATIONS

Office Action dated Jul. 24, 2014 in Taiwanese Application No. 102104361.
Notice of Allowance dated Jul. 29, 2013 in Korean Application No. 10-2012-0023329, filed Mar. 7, 2012.
Office Action dated Jun. 26, 2013 in Korean Application No. 10-2012-0016237, filed Feb. 17, 2012.
Notice of Allowance dated Dec. 27, 2013 in Korean Application No. 10-2012-0016237.
Office Action dated Apr. 8, 2015 in Taiwanese Application No. 102104361.
European Search Report dated Jul. 15, 2015 in European Application No. 13154335.7.
Office Action dated May 10, 2017 in Korean Application No. 10-2013-0027537.
Office Action dated Jan. 31, 2017 in Japanese Application No. 2013025181.

\* cited by examiner

FIG.4
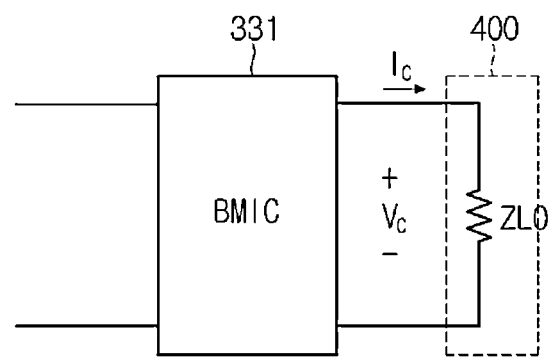
(a)
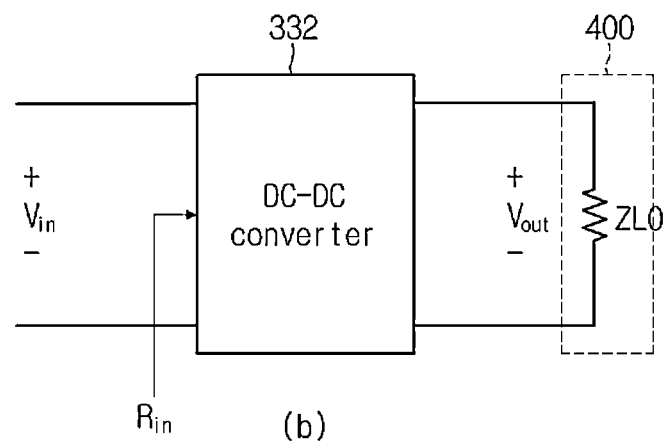
(b)

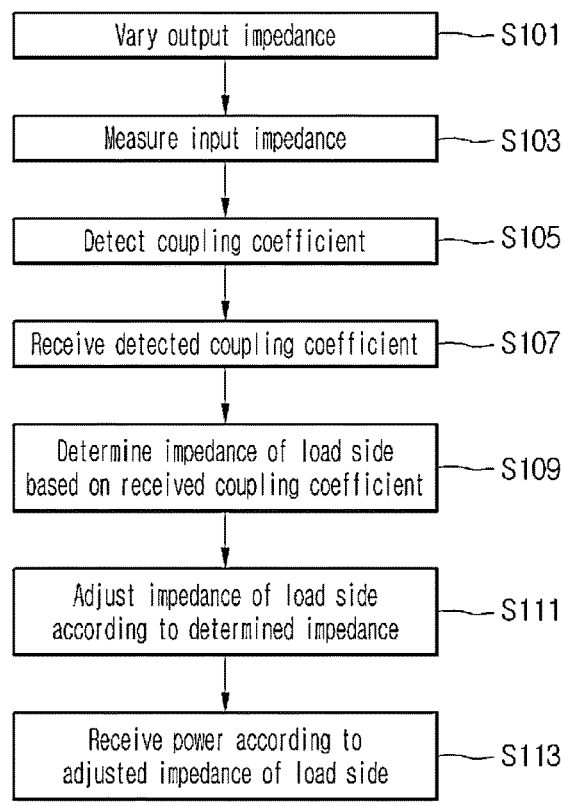

$k_2=0.1$, $L_4=5uH$ $k_2=0.05$, $L_4=5uH$ $k_2=0.03$, $L_4=5uH$ $k_2=0.01$, $L_4=5uH$ k₂=0.1, L₄=20uH k₂=0.05, L₄=5uH $k_2=0.03, \ L_4=4uH$ $k_2=0.01, \ L_4=1.5uH$

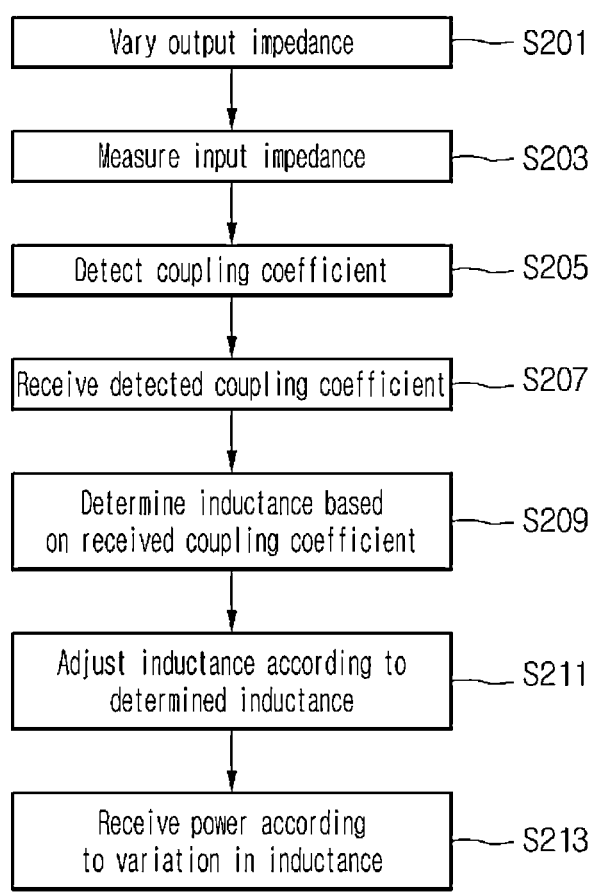

WIRELESS POWER TRANSMITTER, WIRELESS POWER RECEIVER, AND POWER TRANSMISSION METHOD OF WIRELESS POWER TRANSMITTING SYSTEM

CROSS-REFERENCE TO RELATED APPLICATIONS

This application claims the benefit under 35 U.S.C. §119 of Korean Patent Application Nos. 10-2012-0016237, filed Feb. 17, 2012 and 10-2012-0023329, filed Mar. 7, 2012, which are hereby incorporated by reference in their entirety.

BACKGROUND

The embodiment relates to a wireless power transmitter, a wireless power receiver, and a power transmission method of a wireless power transmission system.

A wireless power transmission or a wireless energy transfer refers to a technology of wirelessly transferring electric energy to desired devices. In the 1800's, an electric motor or a transformer employing the principle of electromagnetic induction has been extensively used and then a method for transmitting electrical energy by irradiating electromagnetic waves, such as radio waves or lasers, has been suggested. Actually, electrical toothbrushes or electrical razors, which are frequently used in daily life, are charged based on the principle of electromagnetic induction. Until now, the long-distance transmission using the magnetic induction, the resonance and the short-wavelength radio frequency has been used as the wireless energy transfer scheme.

Recently, among wireless power transmitting technologies, an energy transmitting scheme employing resonance has been widely used.

Since an electric signal generated between the wireless power transmitter and the wireless power receiver is wirelessly transferred through coils in a wireless power transmitting system using resonance, a user may easily charge electronic appliances such as a portable device.

An example of the wireless power transmitting technology is described in Korean Unexamined Patent Publication No. 10-2006-0031526, entitled "Bidirectional chargeable wireless charging pad and battery pack", which implements a separating type transformer having a simple structure and a high coupling coefficient to detect a portable device or the battery pack mounted on a top surface of the wireless charging pad, and to monitor and control a charged state based on the detection result.

However, since impedance of a load side connected to a receiver side or inductance of a coil of the receiver side is fixed, a coupling state between a transmitter side and the receiver side varies so that power transmission efficiency is degraded.

BRIEF SUMMARY

The embodiment provides a wireless power transmitter capable of actively controlling impedance of a load side by efficiently detecting a coupling state between the wireless power transmitter and a wireless power receiver, the wireless power receiver, and a power transmitting method of a wireless power transmitting system.

The embodiment provides a wireless power transmitter capable of varying inductance of a coil included in a wireless power receiver by efficiently detecting a coupling efficient state between the wireless power transmitter and the wireless power receiver, the wireless power receiver, and a power transmitting method of a wireless power transmitting system.

According to the embodiment, there is provided a wireless power transmitter for transmitting power to a wireless power receiver in a wireless scheme, the wireless power transmitter including: a transmitting coil configured to transmit, which is supplied by a power source, to a receiving coil of the wireless power receiver using resonance; and a detecting unit configured to detect a coupling state between the transmitting coil and the receiving coil using an input impedance of the wireless power transmitter.

The detecting unit may detect the coupling state by measuring the input impedance of the wireless power transmitter after fixing output impedance of the wireless power receiver.

The wireless power transmitter may further including a transmission induction coil coupled with the transmitting coil to transfer the power, which is supplied by a power source, to the transmitting coil using electromagnetic induction, wherein the detecting unit may detect a coupling coefficient between the transmitting coil and the receiving coil using the measured input impedance of the wireless power transmitter and an inductance of the transmission induction coil after the output impedance of the wireless power receiver is removed.

The detecting unit may detects the coupling state after fixing output impedance of the wireless power receiver, and transmit information about the coupling state for adjusting impedance of the wireless power receiver to the wireless power receiver through in-band communication or out-of-band communication.

The detecting unit may detect the coupling state after fixing output impedance of the wireless power receiver, and determine impedance variation information of the wireless power receiver based on the coupling state between the transmitting coil and the receiving coil and transmit the determined impedance variation information to the wireless power receiver.

The impedance variation information of the wireless power receiver may include one of impedance variation information of a reception induction coil coupled with the receiving coil to receive power and impedance variation information of a load side.

According to the embodiment, there is provided a wireless power receiver for receiving power from a wireless power transmitter in a wireless scheme, the wireless power receiver including: a receiving coil receiving power from a transmitting coil of the wireless power transmitter using resonance; and an impedance varying unit varying an output impedance of the wireless power receiver in order to detect a coupling state between the transmitting coil and the receiving coil.

The impedance varying unit may include a switch for removing the output impedance of the wireless power receiver.

The wireless power receiver may further include a variable reception induction coil varying an inductance based on the coupling state between the transmitting coil and the receiving coil.

The variable reception induction coil may include a plurality of inductors connected to each other in series and a plurality of switches connected to the inductors in parallel, respectively.

The wireless power receiver may further include a load impedance varying unit varying an impedance of a load side based on the coupling state between the transmitting coil and the receiving coil.

The load impedance varying unit may include one of a Battery Management IC (BMIC) and a DC-DC converter.

According to the embodiment, there is provided a wireless power transmission method of a wireless power transmitting system for transferring power to a load side, the wireless power transmitting method including: varying an output impedance of a wireless power receiver; measuring an input impedance of a wireless power transmitter according to the varied output impedance of the wireless power receiver; and detecting a coupling state between a transmitting coil of the wireless power transmitter and a receiving coil of the wireless power receiver using the measured input impedance of the wireless power transmitter.

The varying of the output impedance of the wireless power receiver may include fixing the output impedance.

The fixing of the output impedance may include removing the output impedance of the wireless power receiver by shorting a switch connected to the load side in parallel.

The detecting of the coupling state may include detecting a coupling coefficient between the transmitting coil and the receiving coil using the measured input impedance of the wireless power transmitter and inductance of a reception induction coil coupled with the receiving coil after removing the output impedance.

The wireless power transmission method may further include varying an impedance of the load side based on the detected coupling state between the transmitting coil and the receiving coil.

The wireless power transmission method may further include varying an inductance of a reception induction coil transferring the power to the load side based on the detected coupling state between the transmitting coil and the receiving coil.

The wireless power transmission method may further include transmitting information about the detected coupling state to the wireless power receiver through in-band communication or out-of-band communication by the wireless power transmitter.

A recording medium is recorded with a program for executing the wireless power transmission method.

According to the embodiment, power transmitting efficiency of the wireless power transmitting system can be improved by adjusting impedance of a load side through efficient detection of a coupling state between the wireless power transmitter and the wireless power receiver.

According to the embodiment, power transmitting efficiency of the wireless power transmitting system can be improved by changing impedance of a coil included in the wireless power receiver through detection of a coupling state between the wireless power transmitter and the wireless power receiver.

Meanwhile, other various effects may be directly or indirectly disclosed in the following description of the embodiment of the disclosure.

BRIEF DESCRIPTION OF THE DRAWINGS

FIG. 4 is a diagram illustrating a method of adjusting impedance of a load side according to the embodiment;

FIG. 5 is a flowchart illustrating a wireless power transmission method of a wireless power transmitting system according to the embodiment;

FIG. 6 is an example of a lookup table in which a coupling coefficient and an impedance of a load side are stored corresponding to each other according to the embodiment;

FIG. 18 is a flowchart illustrating a wireless power transmission method of a wireless power transmitting system according to another embodiment.

DETAILED DESCRIPTION

Hereinafter, embodiments will be described in detail with reference to accompanying drawings so that those skilled in the art can easily work with the embodiments.

Figure 1:
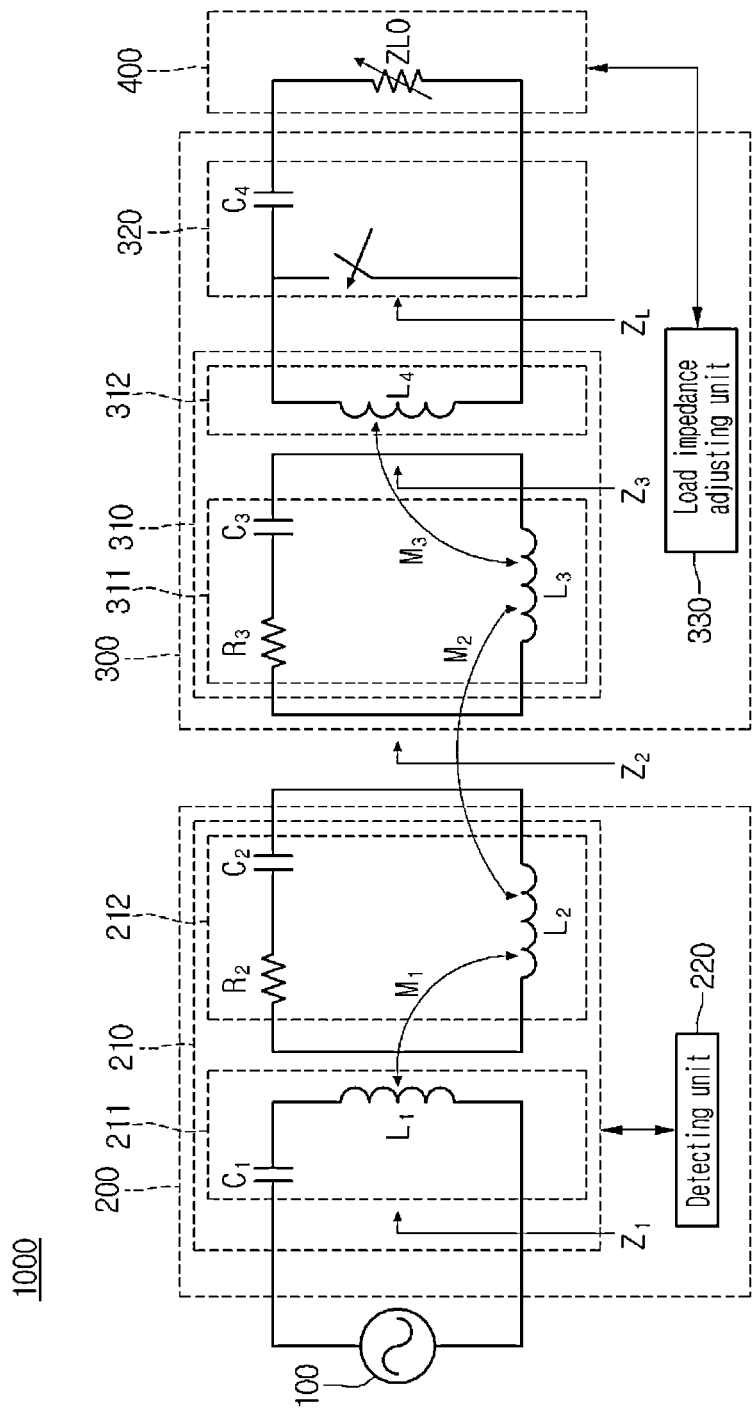
FIG. 1 is a diagram showing a configuration of a resonant wireless power transmitting system according to the embodiment.

FIG. 1 is a diagram showing a configuration of a resonant wireless power transmitting system 100 according to the embodiment.

Referring to FIG. 1, the wireless power transmitting system 1000 may include a power source 100, a wireless power transmitter 200, a wireless power receiver 300, and a load side 400.

The wireless power transmitter 200 may include a transmitting unit 210 and a detecting unit 220.

The transmitting unit 210 may include a transmission induction coil unit 211 and a transmission resonance coil unit 212.

The wireless power receiver 300 may include a receiving unit 310, an output impedance varying unit 320, and a load impedence adjusting unit 330.

The receiving unit 310 may include a reception resonance coil unit 311 and a reception induction coil unit 312.

The power source 100 may supply power to the wireless power transmitter 200. The power source 100 may supply AC power to the wireless power transmitter 200.

The power generated from the power source 100 is transmitted to the wireless power transmitter 200. The power received in the wireless power transmitter 200 is transmitted to the wireless power receiver 300 that makes resonance with the wireless power transmitter 200 due to a resonance phenomenon. The power from the wireless power transmitter 20 to the wireless power receiver 300 is transmitted to the load side 400 through a rectifier circuit (not show). The load side 400 may include a rechargeable battery or other devices requiring power. An impedance of the load side 400 is denoted as 'ZLO' in the embodiment. In the embodiment, the load side 400 may refer to a battery which supplies power to an electronic device.

In the embodiment, the load side 400 may be included in the wireless power receiver 300.

In more detail, the power source 100 may supply AC power having a predetermined frequency to the wireless power transmitter 200.

The transmitting unit 210 of the wireless power transmitter 200 may include the transmission induction coil unit 211 and the transmission resonance coil unit 212.

The transmission induction coil unit 211 is connected to the power source 100, and AC current flows through the transmission induction coil unit 211 by the AC current from the power source 100. When the AC current flows through the transmission induction coil unit 211, the AC current may be induced to the transmission resonance coil unit 212 physically spaced apart from the transmission coil 21 due to electromagnetic induction.

The transmission resonance coil 212 may transmit the power from the transmission resonance coil unit 212 to the reception resonance coil unit 311 of the wireless power receiver 300 using resonance.

Power may be transferred using resonance between two LC circuits which are impedance-matched with each other. The power transfer using resonance is able to transfer power at higher efficiency to a longer distance than those by electromagnetic induction.

The transmission induction coil unit 211 may include a transmission induction coil $L_1$ and a capacitor $C_1$. A capacitance of the capacitor $C_1$ may have a fixed value.

One terminal of the capacitor $C_1$ may be connected to one terminal of the power source 100, and the other terminal of the capacitor $C_1$ may be connected to one terminal of the transmission induction coil $L_1$. The other terminal of the transmission induction coil $L_1$ may be connected to the other terminal of the power source 100.

The transmission resonance coil unit 212 may include a transmission resonance coil $L_2$, a capacitor $C_2$, and a resistor $R_2$. The transmission resonance coil $L_2$ may include one terminal connected to one terminal of the capacitor $C_2$ and the other terminal connected to one terminal of the resistor $R_2$. The other terminal of the resistor $R_2$ may be connected to the other terminal of the capacitor $C_2$. A resistance of the resistor R denotes an amount of power loss of the transmission resonance coil $L_2$.

The detecting unit 220 may detect a first input impedance $Z_1$ which is an impedance measured when viewing the wireless power transmitter 200 at the power source 100 toward. The first input impedance $Z_1$ may be detected using a voltage across the power source 100 and a current flowing through a circuit of the power source 100.

The detecting unit 220 may detect a coupling state between the wireless power transmitter 200 and the wireless power receiver 300 using the first input impedance $Z_1$. In the embodiment, the coupling state may be obtained based on the coupling coefficient between the transmission resonance coil $L_2$ and the reception resonance coil $L_3$. The coupling coefficient represents a degree of the electromagnetic coupling between the transmission resonance coil $L_2$ and the reception resonance coil $L_3$, and may be varied by at least one of a position, a direction and a distance between the transmission resonance coil $L_2$ and the reception resonance coil $L_3$.

The detecting unit 220 may detect the coupling coefficient $k_2$ between the transmission resonance coil $L_2$ and the reception resonance coil $L_3$ using the first input impedance $Z_1$.

The detecting unit 220 may detect the coupling coefficient $k_2$ between the transmission resonance coil $L_2$ and the reception resonance coil $L_3$ by changing an output impedance. In detail, when the output impedance is changed to zero, the detecting unit 220 may detect the coupling coefficient based on the output impedance changed to the zero. In the embodiment, the output impedance may signify an impedance viewed from the receiving unit 310 to the load side 400.

The detector 220 may measure the first input impedance based on the output impedance changed to the zero, and then detect the coupling coefficient $k_2$ using the first input impedance $Z_1$.

The coupling coefficient $k_2$ represents a degree of the electromagnetic couple between the transmission resonance coil $L_2$ and the reception resonance coil $L_3$, and may be varied by at least one of a distance, a direction and a position between the wireless power transmitter 200 and the wireless power receiver 300 in the wireless power transmitting system 1000. The power transfer efficiency in the resonant wireless power transmitting system 1000 may be varied due to the variation in the coupling coefficient $k_2$. The wireless power transmitting system 1000 actively controls the impedance of the load side 400 so that the power transfer efficiency may be improved according to the variation in the coupling coefficient $k_2$.

In order to actively control the impedance of the load side 400, the coupling coefficient $K_2$ between the transmission resonance coil $L_2$ and the reception resonance coil $L_3$ is required. A detailed procedure of detecting the coupling coefficient $k_2$ between the transmission resonance coil $L_2$ and the reception resonance coil $L_3$ will be described below.

The wireless power receiver 300 includes a receiving unit 310, an output impedance varying unit 320, and a load impedance adjusting unit 330. The wireless power receiver 300 may further include a controlling unit (not shown).

The receiving unit 310 may include a reception resonance coil unit 311 and a reception induction coil unit 312.

The reception resonance coil unit 311 may include a reception resonance coil $L_3$, a capacitor $C_3$, and a resistor $R_3$. The reception resonance coil $L_3$ may include one terminal connected to one terminal of the capacitor $C_3$ and the other terminal connected to one terminal of the resistor $R_3$. The other terminal of the resistor $R_3$ may be connected to the other terminal of the capacitor $C_2$. A resistance of the resistor $R_3$ denotes an amount of lost power caused due to a power loss of the reception resonance coil $L_3$.

The reception induction coil unit 312 includes a reception induction coil $L_4$ which has both terminals connected to both terminals of the impedance varying unit 320 and a capacitor (not shown). The reception induction coil unit 312 may form a circuit having suitable inductance and capacitance values.

The reception resonance coil unit 311 may maintain the resonance state with the transmission resonance coil unit 212 at the resonance frequency. That is, the reception resonance coil unit 311 is loosely-coupled with the transmission resonance coil unit 212 such that an AC current flows therethrough. Accordingly, the wireless power transmitter 200 may transmit power to the wireless power receiver 300 side in a non-radiative scheme.

The reception induction coil unit 312 may receive power from the reception resonance coil unit 311 by electromagnetic induction, and the power received at the reception induction coil unit 312 may transferred to the load side 400 after the power is rectified by a rectifier circuit (not shown).

The output impedance varying unit 320 may include a switch SW and a capacitor $C_4$. The switch SW may include one terminal connected to one terminal of the capacitor $C_4$ and the other terminal connected to one terminal of the load side 400. The other terminal of the load side 400 is connected to the other terminal of the capacitor $C_4$.

The impedance varying unit 320 may vary an output impedance $Z_L$ viewed from the reception induction coil $L_4$ to the load side 400. The impedance varying unit 320 may vary the output impedance through the switch SW such that the first input impedance $Z_1$ may be varied.

The switch SW may be shorted for a predetermined time at a predetermined period. The predetermined time may be one second and the predetermined period may be 100 us, but the embodiment is not limited thereto.

The controlling unit (not shown) applies a control signal to the switch SW such that the switch SW is allowed to be open or shorted.

The load impedance adjusting unit 330 may vary the impedance of the load side 400 based on the coupling coefficient $k_2$ between the transmission resonance coil $L_2$ and the reception resonance coil $L_3$.

The load impedance adjusting unit 330 may vary a impedance across the load side 400 through two methods. The two methods will be described with reference to FIGS. 4 and 5.

Hereinafter, a method for detecting the coupling coefficient $k_2$ between the transmission resonance coil $L_2$ and the reception resonance coil $L_3$ by measuring the first input impedance $Z_1$ varied by the output impedance varying unit 320 will be described with reference to FIGS. 2 and 3.

The third input impedance $Z_3$ signifies a measured impedance seen to the load side 400 at the reception resonance coil $L_3$ and may expressed as Equation 1:

$$Z_3 = \frac{w^2 M_3^2}{Z_L + jwL_4} \quad \text{[Equation 1]}$$

wherein 'w' denotes a resonance frequency between the transmission resonance coil $L_2$ and the reception resonance coil $L_3$, and '$M_3$' may be a mutual inductance between the reception resonance coil $L_3$ and the reception induction coil $L_4$. Further, '$Z_L$' may denote an output impedance. Equation 1 is based on the frequency domain and equations which will be described below are also based on the frequency domain.

The second input impedance $Z_2$ signifies a measured impedance viewed to the wireless power receiver 300 at the wireless power transmitter 200 and may be expressed as Equation 2:

$$Z_2 = \frac{jw^3 C_3 M_2^2}{1 - w^2 L_3 C_3 + jwC_3(Z_3 + R_3)} \quad \text{[Equation 2]}$$

wherein '$M_2$' may denote a mutual inductance between the transmission resonance coil $L_3$ and the reception induction coil $L_4$, and '$C_3$' may denote a capacitor which is an equivalent circuit corresponding to the reception resonance coil unit 311. Further, '$R_3$' denotes a resistance corresponding to an amount of power loss caused by power loss of the reception resonance coil $L_3$.

Although the capacitor $C_3$ and the leakage resistor $R_3$ may have fixed values, the mutual inductance $M_2$ may vary according to a coupling coefficient $k_2$ between the transmission resonance coil $L_2$ and the reception resonance coil $L_3$.

The first input impedance $Z_1$ is an impedance measured when viewing the wireless power transmitter 200 at the power source 100 and may be expressed as Equation 3:

$$Z_1 = jwL_1 + \frac{1}{jwC_1} + \frac{jw^3 C_2 M_1^2}{1 - w^2 L_2 C_2 + jwC_2(Z_2 + R_2)} \quad \text{[Equation 3]}$$

wherein '$M_1$' may denote a mutual inductance between the transmission induction coil $L_1$ and the transmission resonance coil $L_2$.

If it is assumed that $R_1$ and $R_2$ have very small values, the $R_1$ and $R_2$ may become '0' (zero). In addition, if the first input impedance $Z_1$ is selected such that resonances between the transmission induction coil $L_1$ and the capacitor $C_1$, between the transmission resonance coil $L_2$ and the capacitor $C_2$, and between the reception resonance coil $L_3$ and the capacitor $C_3$ occur at the same resonance frequency w, the first input impedance $Z_1$ may be expressed as Equation 4:

$$Z_1 = \frac{M_1^2 M_3^2}{M_2^2} \frac{w^2}{Z_L + jwL_4} \quad \text{[Equation 4]}$$

Further, if following Equation 5 and Equation 7 are applied to Equation 4, Equation 4 may be expressed as Equation 8:

$$M_1 = k_1 \sqrt{L_1 L_2} \quad \text{[Equation 5]}$$

wherein '$M_1$' may denote a mutual inductance between the transmission induction coil $L_1$ and the transmission resonance coil $L_2$. The '$k_1$' may denote a coupling coefficient between the transmission induction coil $L_1$ and the transmission resonance coil $L_2$.

$$M_2 = k_2 \sqrt{L_2 L_3} \quad \text{[Equation 6]}$$

wherein '$M_2$' may denote a mutual inductance between the transmission resonance coil $L_3$ and the reception induction coil $L_4$. The '$k_2$' may denote a coupling coefficient between the transmission resonance coil $L_3$ and the reception induction coil $L_4$.

$$M_3 = k_3 \sqrt{L_e L_4} \quad \text{[Equation 7]}$$

wherein '$M_3$' may be a mutual inductance between the reception resonance coil $L_3$ and the reception induction coil $L_4$. The '$k_3$' may denote a coupling coefficient between the reception resonance coil $L_3$ and the reception induction coil $L_4$.

If following Equations 5 to 7 are applied to Equation 4, Equation 4 may be expressed as Equation 8:

$$Z_1 = \frac{k_1^2 k_3^2}{k_2^2} \frac{W^2 L_1 L_4}{Z_L + jwL_4} \quad \text{[Equation 8]}$$

Referring to Equation 8, as the output impedance $Z_L$ varies, the first input impedance $Z_1$ may vary. This procedure will be described in detail with reference to FIGS. 2 and 3.

The controlling unit (not shown) applies a control signal to the impedance varying unit 320 such that the impedance varying unit 320 is controlled. The control signal may include a driving signal for allowing the switch SW to be open or shorted.

Hereinafter, the variations of the output impedance $Z_L$ and the first input impedance $Z_1$ according to whether the switch SW is open or shorted will be described with reference to FIGS. 2 and 3.

Figure 2:
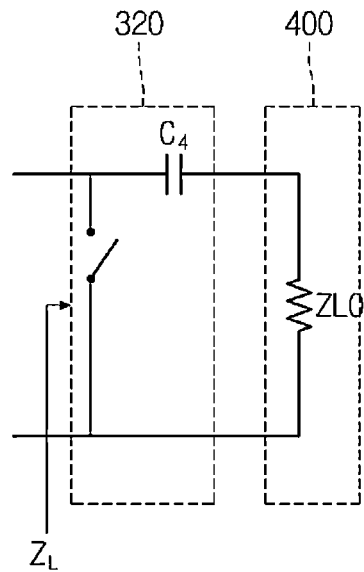
FIG. 2 is a circuit diagram showing a stat that a switch of an output impedance varying unit is open according to the embodiment.

FIG. 2 is a circuit diagram showing a state that the switch SW of the impedance varying unit 320 is open according to the embodiment.

When the switch SW is open, the output impedance varying unit 320 may be expressed as a circuit diagram depicted in FIG. 2.

In this case, the output impedance $Z_L$ may be expressed as Equation 9:

$$Z_L = ZL0 + \frac{1}{jwC_4} \qquad \text{[Equation 9]}$$

If the values of the reception induction coil $L_4$ and the capacitor $C_4$ are selected to allow the reception induction coil $L_4$ and the capacitor $C_4$ to resonate with each other at the resonance frequency w, the first input impedance $Z_L$ of Equation 8 is expressed as Equation 10:

$$Z_1 = \frac{k_1^2 k_3^2}{k_2^2} \frac{W^2 L_1 L_4}{ZL0} \qquad \text{[Equation 10]}$$

In the Equation 10, the '$k_1$' may denote a coupling coefficient between the transmission induction coil $L_1$ and the transmission resonance coil $L_2$, and the '$k_3$' may denote a coupling coefficient between the reception resonance coil $L_3$ and the reception induction coil $L_4$. The '$k_1$' and '$k_3$' may be fixed and known.

The resonance frequency w, the inductance of the transmission induction coil $L_1$ and the inductance of the reception induction coil $L_4$ may be fixe and known. However, the coupling coefficient $k_2$ may be varied by a position, a direction and a distance between the wireless power transmitter 200 and the wireless power receiver 300. When a load having a variable impedance is used, the impedance ZLO of the load side 400 may be changed, it is difficult to detect the coupling coefficient $k_2$.

Hereinafter, a procedure of detecting the coupling coefficient $k_2$ will be described with reference to FIG. 3.

Figure 3:
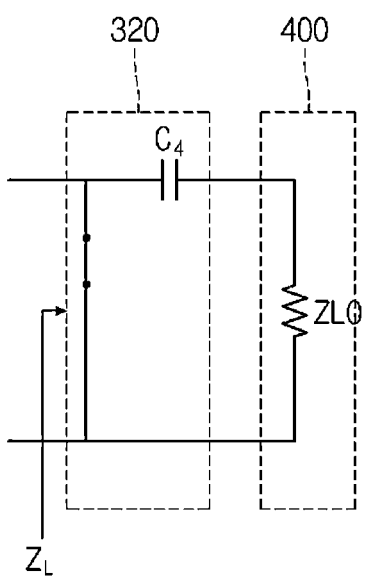
FIG. 3 is a circuit diagram showing a stat that the switch the output impedance varying unit is shorted according to the embodiment.

FIG. 3 is a circuit diagram illustrating a state that the switch SW of the impedance varying unit 320 is shorted.

When the switch SW is shorted, the output impedance varying unit 320 may be expressed as a circuit diagram depicted in FIG. 3.

In this case, the output impedance $Z_L$ may be expressed as Equation 11:

$$Z_L = 0 \qquad \text{[Equation 11]}$$

If the reception induction coil $L_4$ and the capacitor $C_4$ are selected to resonate with each other at the resonance frequency w, the first input impedance $Z_1$ of Equation 8 may be expressed as Equation 12:

$$Z_1 = \frac{k_1^2 k_3^2}{k_2^2}(-jwL_1) \qquad \text{[Equation 12]}$$

The '$k_1$' may denote a coupling coefficient between the transmission induction coil $L_1$ and the transmission resonance coil $L_2$, and the '$k_3$' may denote a coupling coefficient between the reception resonance coil $L_3$ and the reception induction coil $L_4$. The '$k_1$' and '$k_3$' may be fixed and known.

The resonance frequency w and the inductance of the transmission induction coil $L_1$ may be fixed and known.

Accordingly, if the first input impedance $Z_1$ is measured by the detecting unit 220, the coupling coefficient $k_2$ may be obtained. In the embodiment, when a voltage input to the wireless power transmitter 200 is constant, the detecting unit 200 detects a current input to the wireless power transmitter 200 so that the first input impedance $Z_1$ may be measured.

If the coupling coefficient $k_2$ is obtained, the power transfer efficiency may be increased by varying the impedance of the load side 400 based on the coupling coefficient $k_2$. The impedance of the load side 400 may be varied through active control. A method of adjusting the impedance of the load side 400 will be described with reference to FIG. 4 below.

Particularly, when it is necessary to periodically detect the coupling coefficient k2 between the transmission resonance coil $L_2$ and the reception resonance coil $L_3$ prior to transmitting power to a load of the wireless power receiver 300 or while transmitting power to the wireless power receiver 300, as shown in FIG. 3, the switch SW is shorted so that the coupling coefficient k2 may be obtained.

When the switch SW is shorted, power is not transmitted from the wireless power transmitter 200 to the load side 400. Accordingly, when the coupling coefficient is detected while the power is transmitted, it is necessary to reduce a time of a state that the switch SW is shorted. In the embodiment, the switch SW may be shorted for 100 us at a time period of one second. In this case, a failure ratio of power transmission is 1/10000 which does not cause a serious influence on the power transmission.

FIG. 4 is a diagram illustrating a method of adjusting impedance of a load side according to the embodiment.

The load impedance adjusting unit 330 of the wireless power receiver 300 may adjust the impedance of the load side 400 according to the detected coupling coefficient $k_2$. The method of adjusting the impedance of the load side 400 may be implemented by using the following two methods.

One method is to adjust the impedance of the load side 400 by using a Battery Management IC (BMIC) 331 after the BMIC is connected to one terminal and the other terminal of the load side 400.

The BMIC 331 is a device which adjusts an amount of current flowing through a battery. Referring to FIG. 4(a), the impedance of the load side 140 may be expressed by following equation 13:

$$ZLO = \frac{V_C}{I_C} \qquad \text{[Equation 13]}$$

wherein, $I_C$ denotes a current adjusted through the BMIC, and $V_C$ denotes a voltage applied to the load side 400. In this case, the load side 400 may signify a battery for providing power necessary to operate an electronic device.

When a value of $V_C$ is known, the current IC input to the load side 400 may be adjusted through the BMIC 331 such that the impedance ZLO of the load side 400 may be adjusted through equation 13.

The other method is to adjust the impedance of the load side 400 by using a DC-DC converter 332 which is located at the one terminal and the other terminal of the load side 400.

The DC-DC converter 332 performs a function of converting a direct voltage into another direct voltage and is classified into a switching type and a linear type. Preferably, a switching type of DC-DC converter may be used. The switch type is to allow an output side to obtain a suitable current by converting an unstable direct current generated by rectifying AC current into a pulse current by a switch circuit.

Referring to FIG. 4(b), the impedance of the load side 400 may be expressed as following equation 14. In this case, the impedance ZLO of the load side 400 may be replaced with $R_{in}$, and the existing load impedance ZLO may be fixed.

$$R_{in} = E_d \left(\frac{V_{in}}{V_{out}}\right)^2 ZLO \qquad \text{[Equation 14]}$$

wherein, $E_d$ denotes an efficiency of the DC-DC converter 332, $V_{out}$ denotes a voltage applied to an load impedance ZLO, Vin denotes a voltage applied to the load side 140, and $R_{in}$ may denote an impedance measured when viewing the DC-DC converter 332.

Generally, since the efficiency $E_d$ of the DC-DC converter 332, the voltage $V_{in}$ applied to the load side 400, and the existing load impedance have fixed values, the wireless power receiver 300 may change the voltage applied to the load impedance ZLO, thereby adjusting the substituted load impedance $R_{in}$ of the load side 400.

FIG. 5 is a flowchart illustrating a wireless power transmission method of a wireless power transmitting system according to the embodiment.

Hereinafter, the wireless power transmission method according to the embodiment will be described in cooperation with description of FIGS. 1 to 4.

First, in step S101, an output impedance varying unit 320 of the wireless power receiver 300 varies an output impedance. As shown in FIG. 1, the output impedance ZL signifies the impedance measured from the receiving unit 310 to the load side 400. In the embodiment, the impedance varying unit 320 may include the switch SW, and may vary the output impedance by using the switch SW.

The output impedance varying unit 320 applies a short signal to the switch SW so that the switch SW may be shorted for a predetermined time at a predetermined period. The predetermined time may be one second and the predetermined period may be 100 us, but the embodiment is not limited thereto. A procedure of varying the output impedance is the same as that illustrated in FIGS. 2 and 3, and thus the detailed description thereof is appropriately omitted.

Next, the detecting unit 220 of the wireless power transmitter 200 measures an input impedance viewed from a power source 100 to the wireless power transmitter 200 based on the varied output impedance (S 103). In the embodiment, when a voltage input to the wireless power transmitter 200 is known, the detecting unit 220 may detect a current input to the wireless power transmitter 200 to measure a first input impedance $Z_1$ based on the detected input current.

After that, the detecting unit 200 of the wireless power transmitter 200 may detect a coupling coefficient between the transmission resonance coil $L_2$ of the transmitting unit 210 and a reception resonance coil $L_3$ of the receiving unit 310 using the measured input impedance (S105). A procedure of detecting the coupling coefficient by the detecting unit 220 is the same as that illustrated in FIG. 3.

Thereafter, the wireless power receiver 300 receives the detected coupling coefficient from the wireless power transmitter 200 (S107). The wireless power receiver 300 may receive the coupling coefficient from the wireless power transmitter 200 through in-band communication or out-of-band communication. The embodiment has illustrated that the information transmitted from the wireless power transmitter 200 to the wireless power receiver 300 is information regarding the coupling coefficient, but the transmitted information is not limited thereto. That is, the transmitted information may include information signifying a coupling state between the transmission resonance coil and the reception resonance coil, and information regarding the impedance of the load side 400 to be varied by the wireless power receiver 300 based on the coupling state.

The in-band communication may refer to the communication for exchanging information between the wireless power transmitter 200 and the wireless power receiver 300 through a signal having a frequency used in the wireless power transmission.

The out-of-band communication refers to the communication performed through a specific frequency band other than the resonance frequency band in order to exchange information necessary for the power transmission. The wireless power transmitter 200 and the wireless power receiver 300 can be equipped with out-of-band communication modules to exchange information necessary for the power transmission. The out-of-band communication module may be installed in the power supply apparatus. In one embodiment, the out-of-band communication module may use a short-distance communication technology, such as Bluetooth, Zigbee, WLAN or NFC, but the embodiment is not limited thereto.

Subsequently, the wireless power receiver 300 may determine the impedance of the load side 400 based on the received coupling coefficient (S109). The wireless power receiver may further include a storage unit (not show) in which the coupling coefficient and the impedance of the load side 400 are stored corresponding to each other. The wireless power receiver 300 may receive the detected coupling coefficient from the wireless power transmitter 200, and may determine the impedance of the load side 400 using the received coupling coefficient. This will be described with reference to FIG. 6 in detail.

FIG. 6 is an example of a lookup table in which the coupling coefficient and the impedance of the load side 400 are stored corresponding to each other according to the embodiment.

Referring to FIG. 6, the coupling coefficient and the impedance of the load side 400 correspond to each other. That is, the storage unit (not shown) of the wireless power receiver 300 stores a lookup table in which the coupling coefficient and the impedance of the load side 400 are stored corresponding to each other so that the power transmission efficiency between the wireless power transmitter 200 and the wireless power receiver 300 is maximized.

The wireless power receiver 300 may receive the detected coupling coefficient from the wireless power transmitter 200 to search the impedance of the load side 400 corresponding to the received coupling coefficient. The wireless power receiver 300 may determine the impedance of the load side 400 through the search.

In the embodiment, the storage unit (not shown) may be included in the wireless power transmitter 200. That is, the wireless power transmitter 200 may store a lookup table in which the coupling coefficient and the impedance of the load side 400 are stored corresponding to each other. The wireless power transmitter 200 may determine the impedance corresponding to the detected coupling coefficient, and may transmit information about the determined load impedance to the wireless power receiver 300 through in-band communication or out-of-band communication. Since the information about the determined load impedance is information about the load impedance varied according to the detected coupling coefficient, the information about the determined load impedance may be referred to impedance variation information of the wireless power receiver 300.

The load impedance adjusting unit 330 of the wireless power receiver 300 may vary the impedance of the load side 400 using the information about the load impedance received from the wireless power transmitter 200.

Referring back to FIG. 5, the wireless power receiver 300 adjusts the impedance of the load side 400 according to the determined impedance (S111).

The wireless power receiver 300 receives power according to the adjusted impedance of the load side 400 from the wireless power transmitter 200 (S 113).

As described above, the embodiment can improve the power transmission efficiency by varying the impedance of the load side 400 based on the coupling coefficient detected between the transmission resonance coil $L_2$ and the reception resonance coil $L_3$ of the receiving unit 310.

Hereinafter, an embodiment for varying inductance of the reception induction coil unit 312 according to the coupling coefficient according to the coupling coefficient between the wireless power transmitter 200 and the wireless power receiver 300 is described.

Hereinafter, a wireless power transmitting system and a wireless power transmission method thereof according to another embodiment will be described in cooperation with description of FIGS. 1 to 3.

Figure 7:
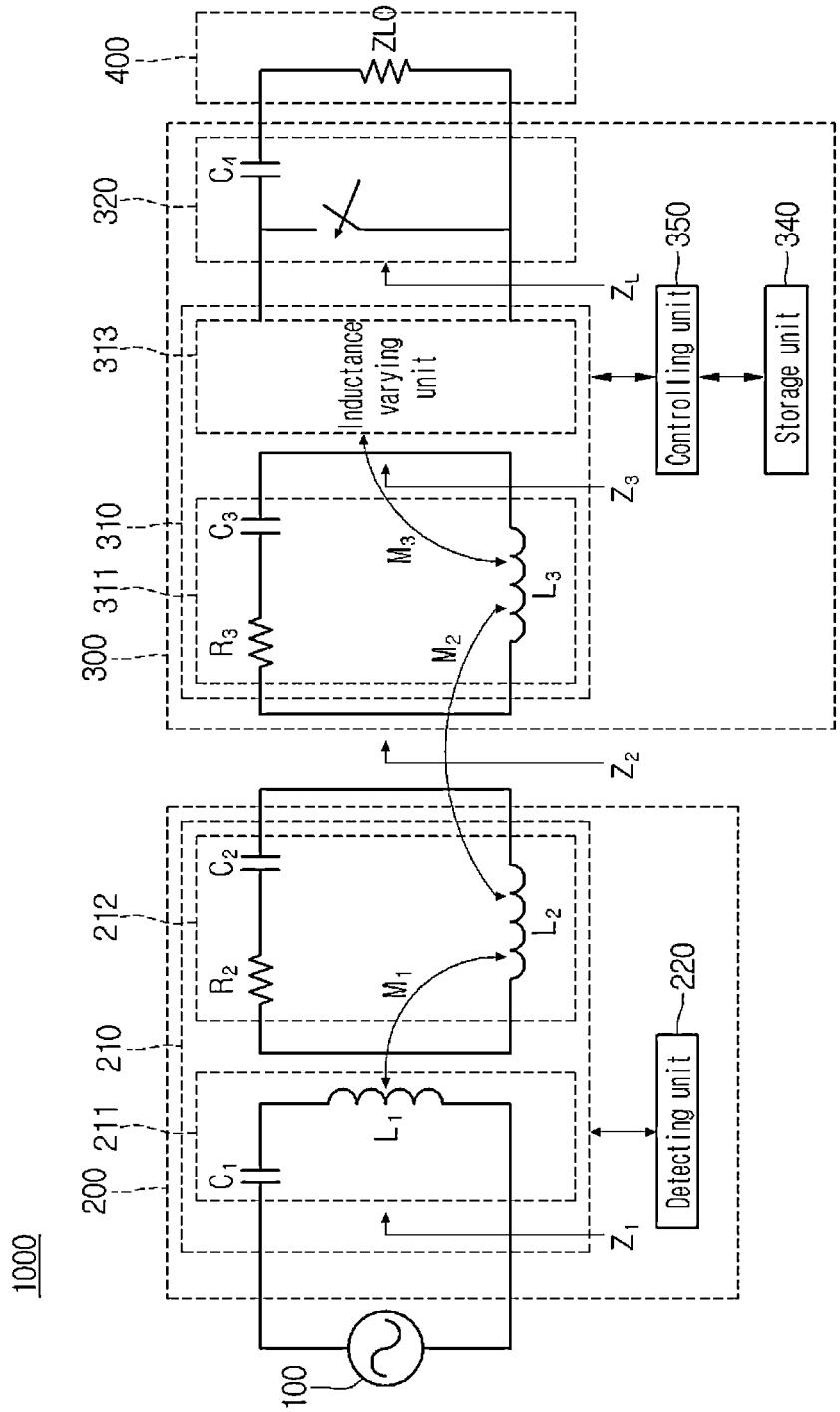
FIG. 7 is a diagram illustrating a configuration of a wireless power transmitting system according to another embodiment.

FIG. 7 is a diagram illustrating a configuration of a wireless power transmitting system according to another embodiment.

Referring to FIG. 7, the wireless power transmitting system 1000 according to another embodiment may include a power source 100, a wireless power transmitter 200, a wireless power receiver 300, and a load side 400.

The power source 100 and the wireless power transmitter 200 have substantially the same functions as those of the power source 100 and the wireless power transmitted 200 shown in FIG. 1, and thus the detailed description thereof is appropriately omitted.

The wireless power receiver 300 may include a receiving unit 310, an inductance varying unit 313, an output impedance varying unit 320, a storage unit 340, and a controlling unit 350.

The receiving unit 310 may include a reception resonance coil unit 311 and a reception induction coil unit 312.

The reception resonance coil unit 311 may receive power from the transmission resonance coil unit 213 through resonance coupling with the transmission resonance coil unit 212. The reception resonance coil unit 311 and the reception induction coil unit 312 have the same configurations as those illustrated in FIG. 1.

The output impedance varying unit 320 may vary an output impedance ZL viewed from an inductance varying unit 313 to be described below to the load side 400.

The inductance varying unit 313 may receive power from the reception resonance coil unit 311 by electromagnetic induction, and may transfer the received power to the load side 400.

The inductance varying unit 313 may basically correspond to the reception induction coil unit illustrated in FIG. 1.

When receiving the coupling coefficient $k_2$ from the wireless power receiver 200, the inductance varying unit 313 may vary the impedance of the reception induction coil unit 312 according to the received coupling coefficient $k_2$. The inductance varying unit 313 may be a variable reception induction coil for varying the inductance of the reception induction coil unit 312. The inductance is varied according to the coupling coefficient $k_2$ in order to maximize the power transmission efficiency between the wireless power transmitter 200 and the wireless power receiver 300. This will be described with reference to FIGS. 8 to 15.

The storage unit 340 may store the coupling coefficient $k_2$ and the impedance of the reception induction coil unit 312 corresponding to each other. That is, the storage unit 340 of the wireless power receiver 300 stores a lookup table in which the coupling coefficient $k_2$ and the impedance of the reception induction coil unit 312 are stored corresponding to each other so that the power transmission efficiency between the wireless power transmitter 200 and the wireless power receiver 300 is maximized.

The wireless power receiver 300 may receive the detected coupling coefficient from the wireless power transmitter 200 to search the inductance of the reception induction coil unit 312 corresponding to the received coupling coefficient from the storage unit 340, and may determine the inductance of the reception induction coil unit 312 through the search.

In the embodiment, the storage unit 340 may be included in the wireless power transmitter 200. That is, the wireless power transmitter 200 may store a lookup table in which the coupling coefficient $k_2$ and the impedance of the reception induction coil unit 312 are stored corresponding to each other. The wireless power transmitter 200 may determine the inductance of the reception induction coil unit 312 corresponding to the detected coupling coefficient, and may transmit information about the determined inductance through in-band communication or out-of-band communication. Since the information about the determined inductance of the reception induction coil unit 312 is information about the load impedance varied according to the detected coupling coefficient, the information about the determined inductance of the reception induction coil unit 312 may be referred to impedance variation information of the wireless power receiver 300.

The inductance varying unit 313 of the wireless power receiver 300 may vary the impedance of the reception induction coil unit 312 using the information about the determined inductance from the wireless power transmitter 200.

Hereinafter, the variation of the power transmission efficiency according to the inductance of the reception induction coil unit 312 will be described with reference to FIGS. 8 to 15.

FIGS. 8 to 11 are graphs illustrating power transmission efficiency according to a resonant frequency when inductance of a reception induction coil unit 312 is fixed as illustrated in FIG. 1. FIGS. 12 to 15 are graphs illustrating power transmission efficiency according to a resonant frequency when an inductance varying unit 313 varies inductance of a reception induction coil according to a coupling coefficient $k_2$.

It is assumed that impedance of the reception induction coil is 5 uH in FIGS. 8 to 11, and a resonant frequency is 308 KHz in FIGS. 8 to 11. However, the embodiment is not limited to 308 KHz.

In the embodiment, when the wireless power transmitter 200 transmits power to the receiving unit 310 in a wireless scheme, power transmitted to the receiving unit 310 from the wireless power transmitter 200 may have various frequency bands. The various frequency bands may three types of frequency bands in the embodiment.

A first frequency band may be in the range of 110 KHz to 205 KHz, and may have a frequency band used in Wireless Power Consortium (WPC) which is a technical specification transmitting power through electromagnetic induction in a wireless scheme.

A second frequency band may be 6.78 MHz, or may have a frequency band used in Alliance for Wireless Power (A4WP) which is a technical specification transmitting power through resonance in a wireless scheme.

A third frequency band may be in the range of 206 KHz to 300 KHz, and may have a frequency band used in Power Matters Alliance (PMA) which is a technical specification transmitting power through electromagnetic induction in a wireless scheme.

However, the above frequency bands are illustrative purpose only.

In FIGS. 8 to 15, a horizontal axis indicates a frequency (unit: MHz), and a vertical axis indicates power transmission efficiency (unit: %) between the wireless power transmitter 200 and the wireless power receiver 300.

Figure 8:
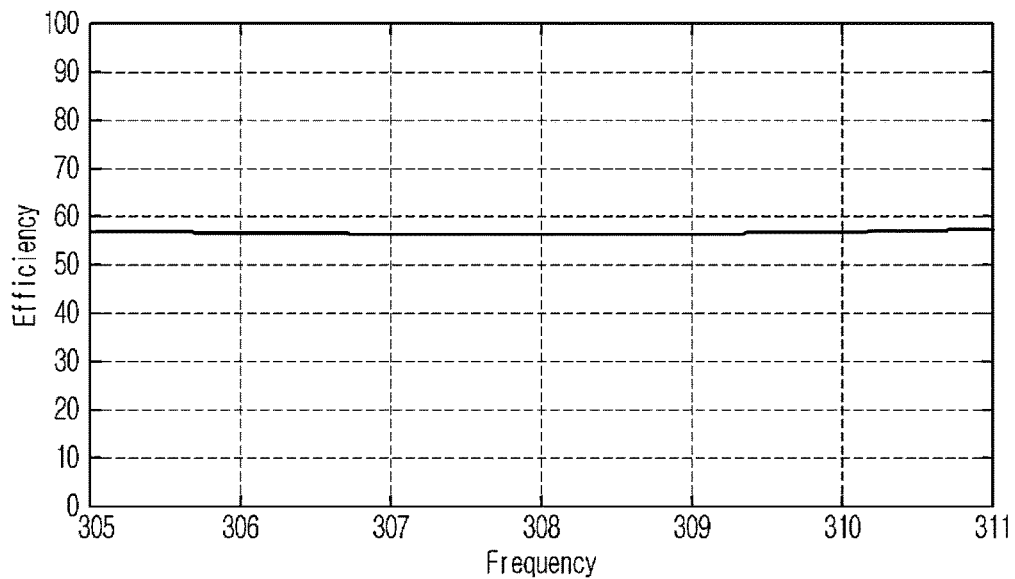
FIGS. 8 to 11 are graphs illustrating power transmission efficiency according to a resonant frequency when inductance of a reception induction coil unit is fixed.
Figure 12:
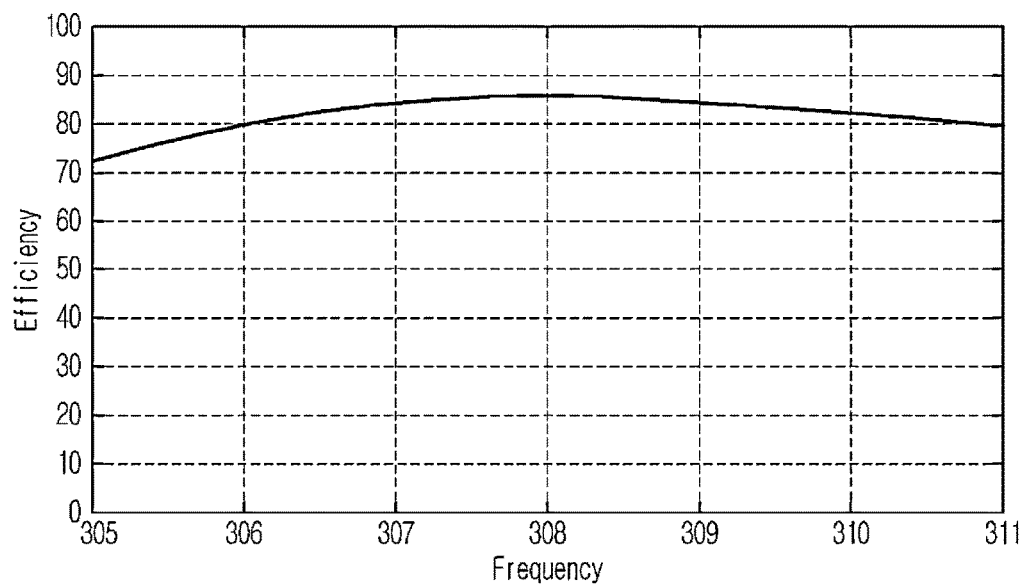
FIGS. 12 to 15 are graphs illustrating power transmission efficiency according to a resonant frequency when an inductance varying unit varies inductance of a reception induction coil according to a coupling coefficient.

First, FIG. 12 is compared with FIG. 8 in which the coupling coefficient $k_2$ is 0.1.

Referring to FIG. 8, when inductance of the reception induction coil $L_4$ is fixed to 5 uH, power transmission efficiency at a resonant frequency (308 KHz) is about 58%. In a case of FIG. 12, when the inductance of the reception induction coil $L_4$ is varied to 20 uH, the power transmission efficiency at a resonant frequency (308 KHz) is increased to about 85%. The power transmission efficiency in a frequency band similar to the resonant frequency (308 KHz) is substantially maintained constant.

That is, if the inductance of the reception induction coil $L_4$ is varied corresponding to the coupling coefficient $k_2$, it may be confirmed that the power transmission efficiency is improved.

Figure 9:
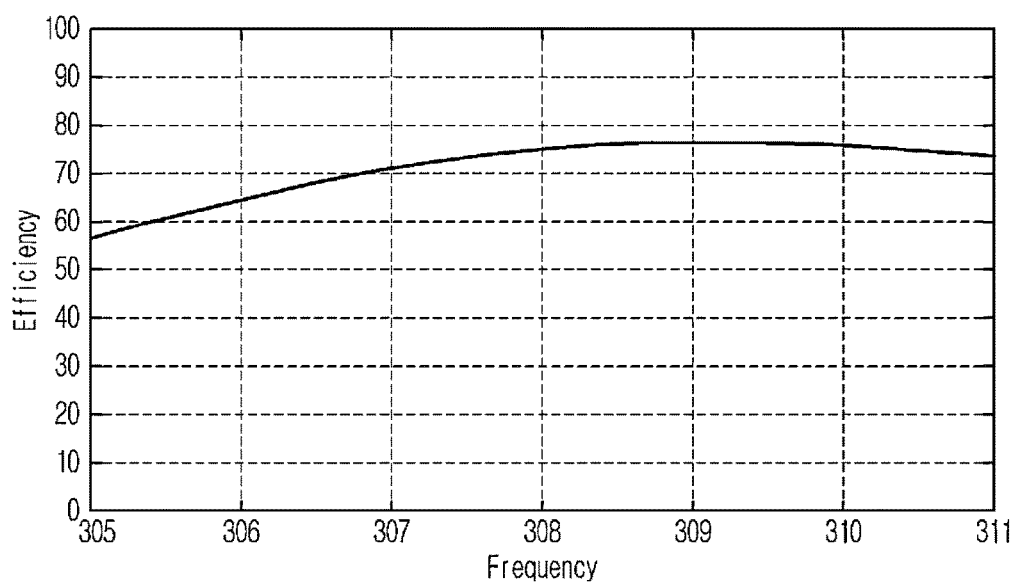
Figure 13:
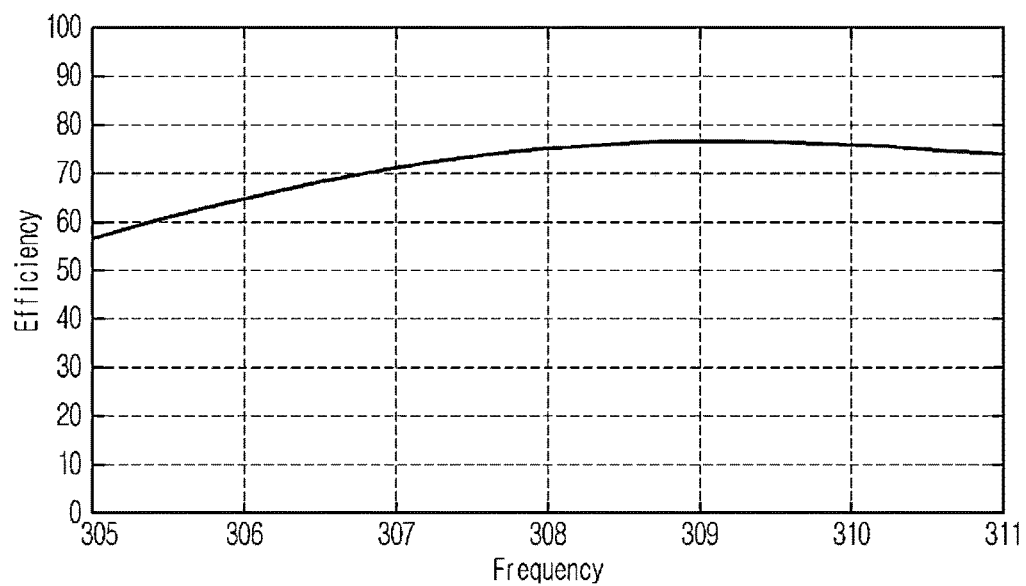

Next, FIG. 13 is compared with FIG. 9 when the coupling coefficient $k_2$ is 0.05.

Referring to FIG. 9, when inductance of the reception induction coil $L_4$ is fixed to 5 uH, power transmission efficiency at a resonant frequency (308 KHz) is about 75%. In a case of FIG. 13, when the inductance of the reception induction coil $L_4$ is varied to 5 uH, the power transmission efficiency at a resonant frequency (308 KHz) is increased to about 75%, which is the same as that of FIG. 9.

That is, in a case where the coupling coefficient $k_2$ is 0.05, if the inductance of the reception induction coil $L_4$ is 5 uH, the power transmission efficiency is optimized at a resonant frequency band.

Figure 10:
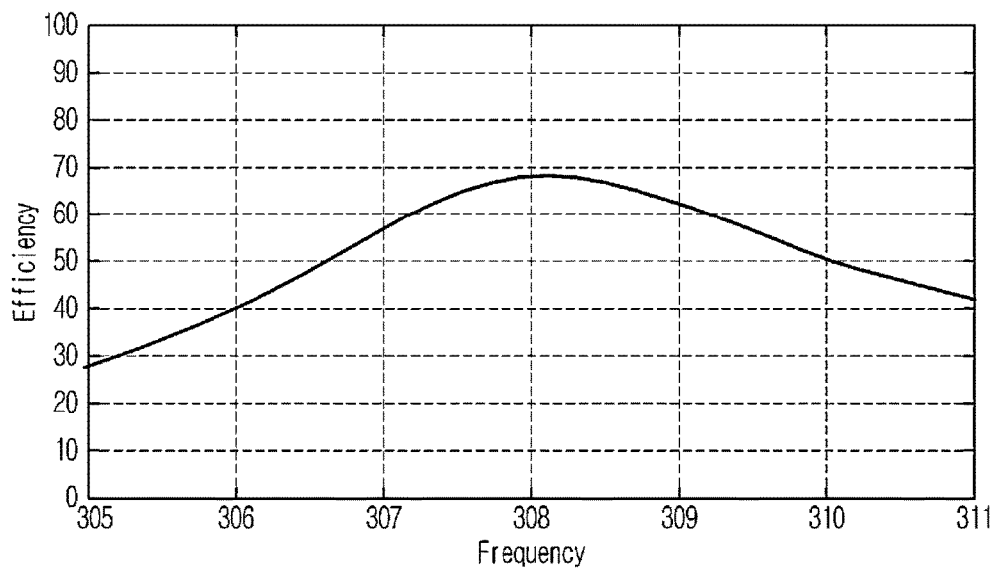
Figure 14:
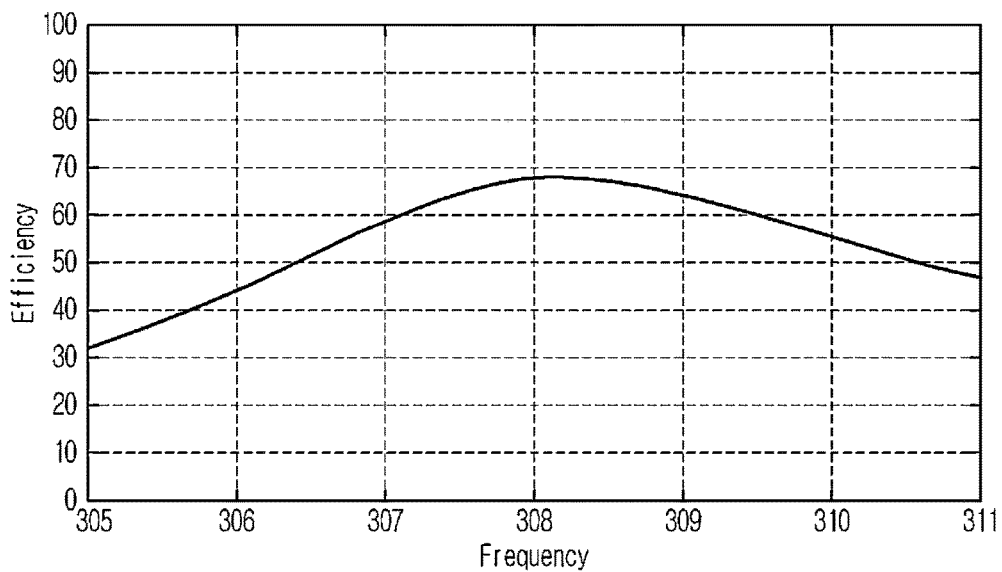

After that, FIG. 14 is compared with FIG. 10 in which the coupling coefficient $k_2$ is 0.03.

Referring to FIG. 10, when inductance of the reception induction coil $L_4$ is fixed to 5uH, power transmission efficiency at a resonant frequency (308 KHz) is about 68%. In a case of FIG. 14, when the inductance of the reception induction coil $L_4$ is varied to 4 uH, the power transmission efficiency at a resonant frequency (308 KHz) is increased to about 68%, which is similar to that of FIG. 10, but the power transmission efficiency in a frequency band greater than the resonant frequency (308 KHz) may be improved.

That is, when the inductance of the reception induction coil $L_4$ is varied corresponding to the coupling coefficient $k_2$, the power transmission efficiency may be improved.

Figure 11:
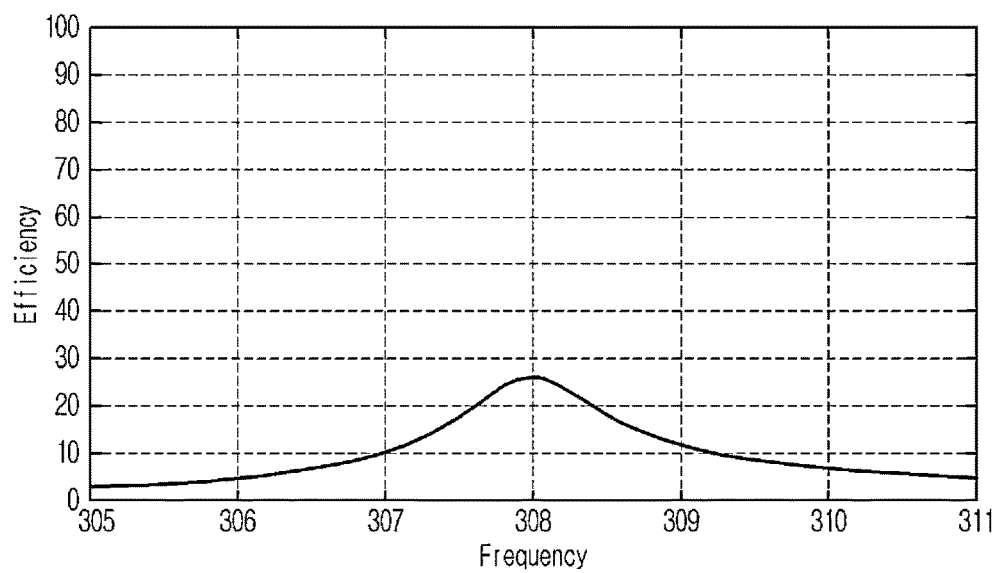
Figure 15:
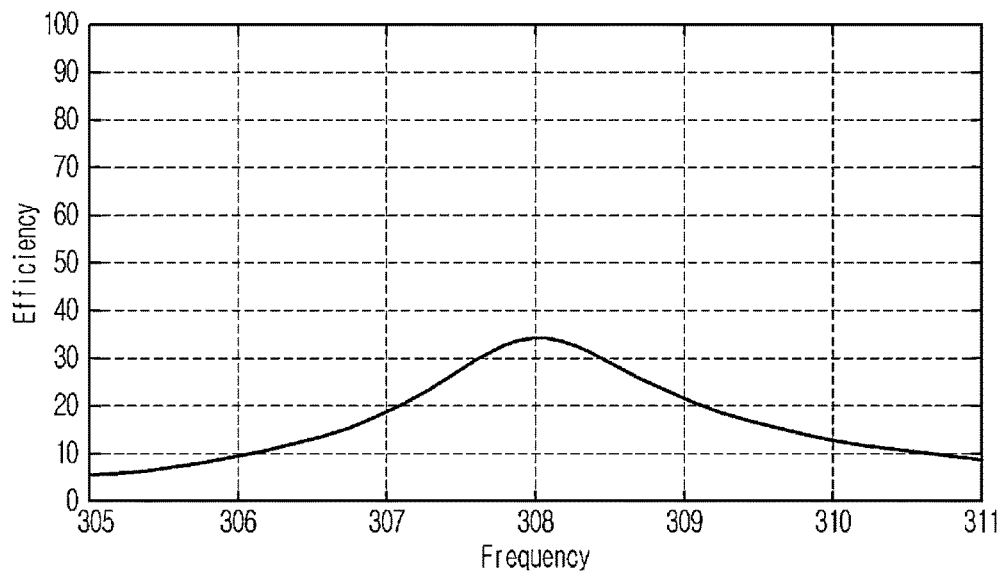

Thereafter, FIG. 15 is compared with FIG. 11 in which the coupling coefficient $k_2$ is 0.01.

Referring to FIG. 11, when inductance of the reception induction coil $L_4$ is fixed to 5 uH, power transmission efficiency at a resonant frequency (308 KHz) is about 27%. In a case of FIG. 15, when the inductance of the reception induction coil $L_4$ is varied to 1.5 uH, the power transmission efficiency at a resonant frequency (308 KHz) is increased to about 34%, so that efficiency can be improved.

That is, when the inductance of the reception induction coil $L_4$ is varied corresponding to the coupling coefficient $k_2$, the power transmission efficiency may be improved.

Figure 16:
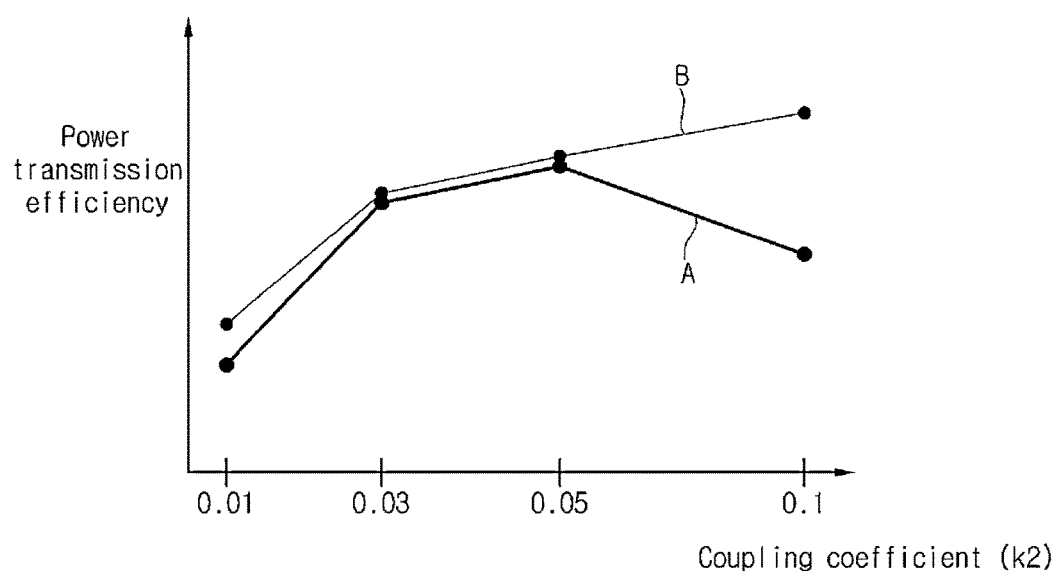
FIG. 16 is a graph integrally showing the results of FIGS. 8 to 15.

FIG. 16 is a graph integrally showing results of FIGS. 8 to 15.

FIG. 16 is a graph illustrating variation of power transmission efficiency E in a case of fixing inductance of the reception induction coil $L_4$ and in a case of varying the inductance according to the coupling coefficient $k_2$.

Referring to FIG. 16, a graph A illustrates the variation of the power transmission efficiency E according to variation in the coupling coefficient $k_2$ when the inductance of the reception induction coil $L_4$ is fixed. A graph B illustrates the variation of the power transmission efficiency E according to the coupling coefficient $k_2$ when the inductance of the reception induction coil $L_4$ is varied according to the coupling coefficient k2 by the inductance varying unit 313.

As illustrated in FIG. 16, the case of varying the inductance of the reception induction coil $L_4$ according to the coupling coefficient $k_2$ by the inductance varying unit 313 may be improved in the power transmission efficiency E as compared with the case of fixing the inductance of the reception induction coil $L_4$.

FIG. 7 is again described.

The inductance varying unit 313 may be variously implemented in order to vary the inductance of the reception induction coil $L_4$ shown in FIG. 1. In the embodiment, the inductance varying unit 313 may vary the inductance of the reception induction coil $L_4$ through a plurality of inductors and a plurality of switches. The configuration of the inductance varying unit 313 will be described with reference to FIG. 17.

Figure 17:
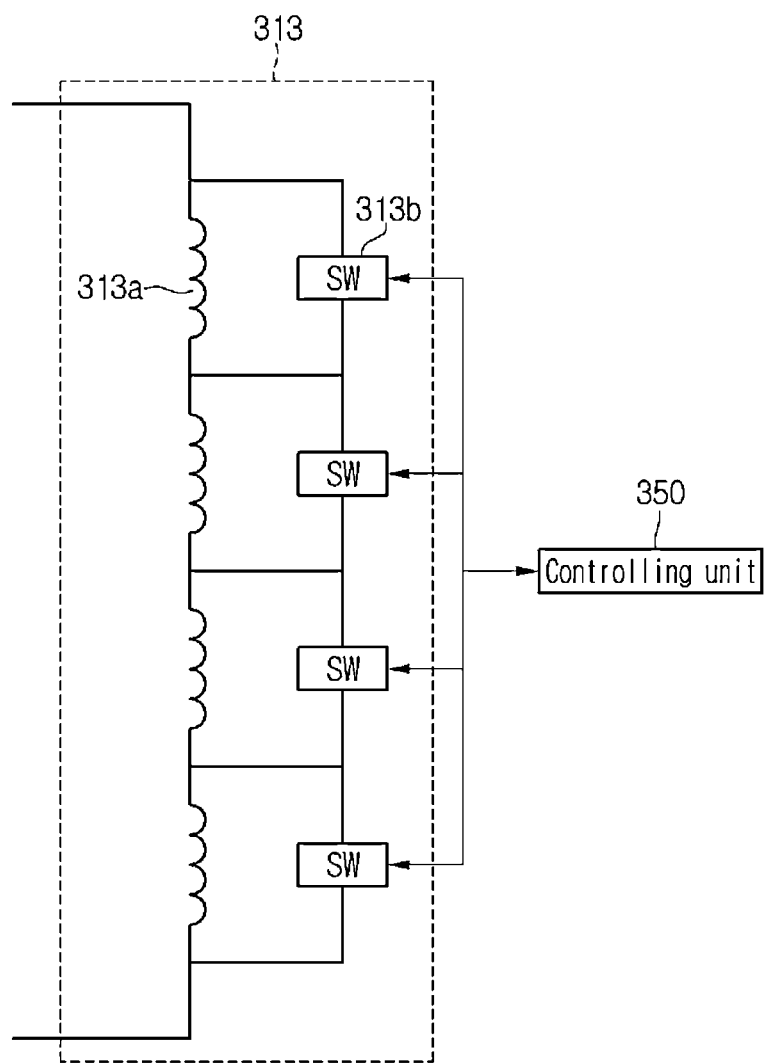
FIG. 17 is a diagram illustrating an example of a configuration of the inductance varying unit according to the embodiment.

FIG. 17 is a diagram illustrating an example of a configuration of the inductance varying unit 313 according to the embodiment.

Referring to FIG. 17, the inductance varying unit 313 according to the embodiment may include a plurality of inductors 313a and a plurality of switches 313b. The inductance varying unit 313 may include fourth inductors and four switches, but the embodiment is not limited to the fourth inductors and the four switches.

Inductances of the inductors 313a may be the same as or different from each other.

One terminal of each inductor 313a is connected to each switch 313b in parallel. The inductors 313a are connected to each other in series so that the inductance may be increased. The inductors 313a are connected to each other in parallel so that the inductance may be reduced.

The controlling unit 350 of the wireless power receiver 300 may receive the coupling coefficient $k_2$ from the wireless power transmitter 200, and may determine inductance corresponding to the received coupling coefficient $k_2$.

The inductance varying unit 313 may vary the inductance of the inductance varying unit 313 by shorting or opening at least one of the switches 313b according to the determined inductance. When the four switches 313b are all open, the four inductors 313a may be connected to each other in series. The serially connected inductors may correspond to the reception inductor coil unit 312 of FIG. 1.

The inductance varying unit 313 may acquire the inductance determined through a combination of the inductors 313a. Accordingly, the power transmission efficiency between the wireless power transmitter 200 and the wireless power receiver 300 may be optimized.

Referring back to FIG. 7, the storage unit 340 may store the coupling coefficient $k_2$ and the inductance of the reception induction coil corresponding to each other. That is, the storage unit 340 may store the coupling coefficient $k_2$ and the inductance of the reception induction coil corresponding to each other in the form of a lookup table.

The controller 350 may control an overall operation of the wireless power receiver 300. Particularly, the controlling unit 350 may apply a control signal to respective switches 313b of the inductance varying unit 313 so that the inductance of the reception induction coil corresponds to the coupling coefficient $k_2$ detected by the detecting unit 220. In the embodiment, the control signal may be an open or short signal to be transferred to at least one switch.

FIG. 18 is a flowchart illustrating a wireless power transmission method of a wireless power transmitting system according to another embodiment.

Hereinafter, the wireless power transmission method of a wireless power transmitting system according to another embodiment will be described with reference to FIGS. 1 to 17.

First, steps S201 to S207 are the same as steps S101 to S107 illustrated in FIG. 5, and thus the detailed description thereof is appropriately omitted.

A wireless power receiver 300 determines inductance of a reception induction coil based on a coupling coefficient received from a wireless power transmitter 200 (S209). In the embodiment, the wireless power receiver 300 may receive the detected coupling coefficient from the wireless power transmitter 200 to search the inductance of the reception induction coil corresponding to the received coupling coefficient. The wireless power receiver 300 may determine the inductance of the reception induction coil through the search.

After that, an inductance varying unit 313 of the wireless power receiver 300 varies the inductance of the reception induction coil according to the determined inductance (S211). A method of varying the inductance is the same as that illustrated in FIG. 17.

The wireless power receiver 300 receives power from the wireless power transmitter 200 according to the variation in the inductance of the reception induction coil.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

In the embodiment, the method of transmitting power through electromagnetic induction may signify tight coupling having a relatively low Q value. The method of transmitting power through resonance may signify loose coupling having a relatively high Q.

What is claimed is:

1. A wireless power transmitter for transmitting power to a wireless power receiver in a wireless scheme, the wireless power transmitter comprising:

a transmitting coil configured to transmit power, which is supplied by a power source, to a receiving coil of the wireless power receiver using resonance; and a detecting unit configured to measure an input impedance of the wireless power transmitter according to a varied output impedance of the wireless power receiver and detect a coupling coefficient between the transmitting coil and the receiving coil using the measured input impedance of the wireless power transmitter; and an output impedance varying unit, configured to vary the output impedance viewed from the receiving coil to a load side, comprising a switch and a capacitor, wherein a switch of wireless power receiver is connected to the receiving coil in parallel such that current does not flow to a load of the wireless power receiver when the switch of wireless power receiver is shorted, wherein the switch of wireless power receiver has a first terminal connected to the capacitor and a second terminal connected to a terminal of the load side, wherein the input impedance is measured as seen by the power source, wherein the output impedance signifies an impedance viewed from the receiving coil to the load side, wherein the measured input impedance for detecting the coupling coefficient is measured when the switch of wireless power receive is shorted such that the output impedance is zero.

2. The wireless power transmitter of claim 1, wherein the detecting unit detects the coupling state after fixing output impedance of the wireless power receiver, and transmits information about the coupling state for adjusting impedance of the wireless power receiver to the wireless power receiver through in-band communication or out-of-band communication.

3. The wireless power transmitter of claim 1, wherein the detecting unit detects the coupling state after fixing output impedance of the wireless power receiver, and determines impedance variation information of the wireless power receiver based on the coupling coefficient between the transmitting coil and the receiving coil and transmits the determined impedance variation information to the wireless power receiver.

4. The wireless power transmitter of claim 3, wherein the impedance variation information of the wireless power receiver comprises one of impedance variation information of a reception induction coil coupled with the receiving coil to receive power and impedance variation information of a load side.

5. A wireless power receiver for receiving power from a wireless power transmitter in a wireless scheme, the wireless power receiver comprising:

a receiving coil configured to receive power from a transmitting coil of the wireless power transmitter using resonance;

an impedance varying unit configured to vary an output impedance of the wireless power receiver in order to detect a coupling coefficient between the transmitting coil and the receiving coil; and a load impedance adjusting unit configured to vary an impedance of a load side according to the detected coupling coefficient based on the varied output impedance from the wireless power transmitter, wherein the output impedance signifies an impedance viewed from a receiving unit to a load side, wherein the impedance varying unit includes a switch that is configured to change the output impedance to zero for detecting the coupling coefficient.

6. The wireless power receiver of claim 5, further comprising a variable reception induction coil configured to vary an inductance based on the coupling state between the transmitting coil and the receiving coil.

7. The wireless power receiver of claim 6, wherein the variable reception induction coil comprises a plurality of inductors connected to each other in series and a plurality of switches connected to the inductors in parallel, respectively.

8. A wireless power transmission method of a wireless power transmitting system for transferring power to a bad side, the wireless power transmitting method comprising:
varying an output impedance of a wireless power receiver to zero by shorting a switch connected to a load of the wireless power receiver in parallel;
measuring an input impedance of a wireless power transmitter when the varied output impedance of the wireless power receiver is zero; and
detecting a coupling coefficient between a transmitting coil of the wireless power transmitter and a receiving coil of the wireless power receiver by using the measured input impedance of the wireless power transmitter,
wherein the input impedance is measured as seen by a power source, wherein the output impedance signifies an impedance viewed from a receiving coil to a the bad side, and
wherein the coupling coefficient is periodically measured between a transmission resonance coil unit and a reception resonance coil unit.

9. The wireless power transmission method of claim 8, wherein the varying of the output impedance of the wireless power receiver comprises fixing the output impedance.

10. The wireless power transmission method of claim 8, further comprising varying an inductance of a reception induction coil transferring the power to the load side based on the detected coupling state between the transmitting coil and the receiving coil.

11. The wireless power transmission method of claim 8, further comprising transmitting information about the detected coupling state to the wireless power receiver through in-band communication or out-of-band communication by the wireless power transmitter.

* * * * *